United States Patent [19]
Gunther

[11] 4,333,211
[45] Jun. 8, 1982

[54] SLIP-ON RECEPTACLE

[75] Inventor: Conrad J. Gunther, Uniondale, N.Y.

[73] Assignee: Dzus Fastener Co., Inc., West Islip, N.Y.

[21] Appl. No.: 130,020

[22] Filed: Mar. 13, 1980

[51] Int. Cl.³ .............................................. F16B 37/04
[52] U.S. Cl. .................................. 24/221 R; 411/175; 411/527
[58] Field of Search ................... 151/48.75; 85/32 K; 24/221 R, 221 A, 221 K; 411/175, 527

[56] References Cited

U.S. PATENT DOCUMENTS

| | | | |
|---|---|---|---|
| Re. 21,769 | 4/1941 | Tinnerman | 151/41.75 X |
| 2,228,584 | 1/1941 | Place | 151/41.75 |
| 2,230,355 | 2/1941 | Kost | 151/41.75 |
| 2,274,014 | 2/1942 | Tinnerman | 151/41.75 X |
| 2,798,277 | 7/1957 | Flora | 24/221 R |
| 3,123,880 | 3/1964 | Barry et al. | 151/41.75 X |
| 3,308,708 | 3/1967 | Holton | 151/41.75 X |
| 3,358,729 | 12/1967 | Munse | 151/41.75 |
| 3,802,033 | 4/1974 | Gley | 24/221 R |
| 4,202,390 | 5/1980 | Schenk | 151/41.75 |

FOREIGN PATENT DOCUMENTS

| | | | |
|---|---|---|---|
| 1255987 | 2/1961 | France | 151/41.75 |
| 2232698 | 1/1975 | France | 151/41.75 |

Primary Examiner—Thomas J. Holko
Attorney, Agent, or Firm—Kane, Dalsimer, Kane, Sullivan and Kurucz

[57] ABSTRACT

A slip-on receptacle adapted to be inserted on one of two members to be fastened in alignment with a hole therein and to receive and engage with a stud coupled with the other of the two members so as to fasten the two members together. The receptacle includes a resilient strip folded upon itself with one section of the strip engaging the undersurface of the one member and another section of the strip engaging the upper surface of the one member. A central portion of the strip is severed along both side edges and across the one end thereof which is folded upwardly and back upon itself above the upper section to form a cantilever spring. The cantilever spring is in alignment with the hole in the one member and is designed to receive the stud coupled with the other member and passed through the hole and to interengage with the stud and hold the members together. The two sections of the strip are in close fitting position on the one member in order to reinforce the fastening action and discourage separation of the members when the stud and receptacle are coupled.

9 Claims, 10 Drawing Figures

SLIP-ON RECEPTACLE

BACKGROUND OF THE INVENTION

One common type of fastener employs a stud with a spiral cam slot in a receptacle with a cam follower for engaging the spiral cam slot. A spring is provided to permit the cam follower to follow the cam slot along the surface of the stud and in turn to provide a locking force for two members when the stud is coupled with one of the members and the receptacle is coupled with the other. With fasteners of this type, it is common to couple the stud with the one member to be fastened and to mount the receptacle on the other member to be fastened in some conventional fashion such as by rivets or screws. In this manner when the stud and receptacle are coupled the two members engaged therewith will be held together by coupled fasteners.

Naturally mounting of the receptacle on the one member in position to receive the stud can be a time consuming and costly procedure. This is particularly true when one is dealing with environments where a large number of fasteners are being employed. Installation time and other cost factors become important. Accordingly, there is always a need for an improved fastener receptacle which can be easily and quickly coupled with one of the members.

Throughout the years various types of slip-on receptacles have been developed which are designed so that the receptacle can be attached to a member to be fastened quickly and efficiently and without the necessity of additional fastener elements. Examples of this appear in U.S. Pat. Nos. 3,802,033; 3,454,071; 2,101,287; 2,230,355; 2,378,257; 3,088,560; 3,123,880; 3,755,860; and French Pat. No. 2,249,572.

The variety of different types of receptacles to accommodate different structural difficulties are readily apparent. A more versatile, improved and inexpensive slip-on receptacle is clearly always in demand and particularly one which solves existing structural expediencies with regard to the types of members being fastened. One successful solution is present in commonly assigned pending application Ser. No. 900,142 filed on Apr. 26, 1978, now U.S. Pat. No. 4,202,390.

SUMMARY OF THE INVENTION

With the above background in mind, it is among the primary objectives of the present invention to provide a one piece slip-on receptacle which is a further improvement of the receptacle disclosed in the above referenced copending commonly assigned application. The receptacle is designed so that it can be placed on a member, such as a panel, to be fastened to another member with the receptacle in position to receive a stud and interengage therewith to couple two members together. The receptacle is designed so that it can be slipped into position in one easy motion and contains a snap and retention lip so that the receptacle will not pull out of alignment and into engagement with a fastening hole in the one member to which it is being fastened when subjected to shock load and it will also not slide out of position avoiding the possibility of jamming a stud to be passed through the aligned holes for the coupling action. The receptacle is also designed so that the members being fastened will not separate when coupled by use of the receptacle under a lesser amount of locking tension than the locking tension between the stud and the stud engagement means on the receptacle. The members cannot be separated until the locking tension between the receptacle and the stud is exceeded.

It is also an objective to provide a receptacle which can be used for a wide range of member thicknesses, such as in one general size embodiment from 0.7 mm to 3.0 mm.

A spring mechanism is provided on the receptacle for permitting engagement and disengagement with the stud in fastening and unfastening operations. The receptacle is designed so that it can be mounted in position without the necessity of additional hardware. It contains an integral spring mechanism to accommodate the necessary fastening action with respect to the stud as well as a separate spring mechanism for mounting of the receptacle on the member being fastened.

The receptacle is designed so that the maximum receptacle height remains constant. The receptacle adjusts to accommodate a range of support thicknesses as discussed above. With a fixed height, mass production and mass use is facilitated as well as simplifying the table required for receptacles of this type.

Receptacle of the present invention includes spring sections designed to be only as wide as necessary to hold the receptacle in place on one of the members to be fastened. Thus the overall size of the receptacle is maintained at a minimum. Also, the tension of the spring section in retaining the receptacle in position is independent from the locking tension between the receptacle and the stud when used to lock and hold two members together.

The present receptacle is designed so that the grip length of the fastener is constant from the side of the member being fastened opposite to the side where a receptacle cantilever spring is located to engage with the stud. Also, the spring load for the cantilever spring portion to engage with the stud can be much lower since it is separated from the spring section engaging and holding the receptacle on the member. The independent spring force can be adjusted by varying the material thickness widths of the cantilever spring.

In the receptacle of the present invention, there are two resilient spring sections formed by bending a strip of spring material back upon itself for gripping the member being fastened with a predetermined load to hold the member between the spring sections. The receptacle has a general U-shaped configuration with the member on which it is mounted held between the opposing sides. The cantilever spring is formed by severing a central portion of the strip along both side edges and across one end thereof and folding it upwardly and back upon itself and spaced from the adjacent spring section to form a cantilever spring.

The cantilever spring is spaced from the two spring sections and overlies the adjacent spring section. The cantilever spring has a separate spring strength from the spring sections and is located a fixed distance beyond the side of the member on which the receptacle is mounted opposite to the side facing the cantilever spring.

The receptacle permits the member or panel to be inserted between the spring sections which can be separated a range of distances apart to accommodate various panel thickness and hold the receptacle on the panel. However, the distance between the cantilever spring and the surface of the panel opposite to the cantilever spring remains the same. To facilitate operation of the receptacle, the cantilever spring is generally made slightly less stiff than the spring section and this is accomplished by varying the respective dimensions.

When a stud is inserted through the receptacle and engages tangs in the cantilever spring, the locking tension on the stud is a function of the spring action of the cantilever spring in which the tangs are located. The panel or member holding tension is a function of the spring sections and the tangs on the cantilever spring. If the spring force is exceeded, the entire receptacle will move toward the panel on which the stud is mounted until the cantilever spring bottoms. Thus, the panel containing the stud is always clamped to the panel containing the receptacle, but separation can occur if the spring load is exceeded. This forms an acceptable fastener arrangement consistent with preferred designed criteria. There is no looseness between parts at any time.

Tightness between the members or panels being fastened is facilitated by the fact that the spring sections are more closely spaced than the cantilever spring and the adjacent spring section. Thus there is no room for play and movement of the members when subjected to tension less than the locking tension between the cantilever spring and the stud. The spring sections are in close adjacent relationship with respect to the member being fastened along at least a substantial portion of the spring section and thus serves to hold the two members from being tipped, tilted or displaced relative to one another when subjected to forces particularly tension forces less than the locking forces between the cantilever spring and the stud.

In summary, a slip-on receptacle is provided which is adapted to be mounted on one of two members to be fastened in alignment with a hole therein and to receive and engage with a stud coupled with the other of the two members so as to fasten the two members together. The receptacle includes a resilient strip folded upon itself with one section of the strip engaging the undersurface of the one member and another section of the strip engaging the upper surface of the one member. A central portion of the strip is severed along both side edges and across one end thereof which is folded upwardly and back upon itself above the upper section to form a cantilever spring. Stud engaging means is on the cantilever spring in alignment with the hole in the one member to receive the stud coupled with the other member and pass through the hole and to interengage with the stud and hold the members together. The two sections are in close fitting position on the one member in order to reinforce the fastening action and discourage separation of the members when the stud and receptacle are coupled.

DETAILED DESCRIPTION

Figure 1:
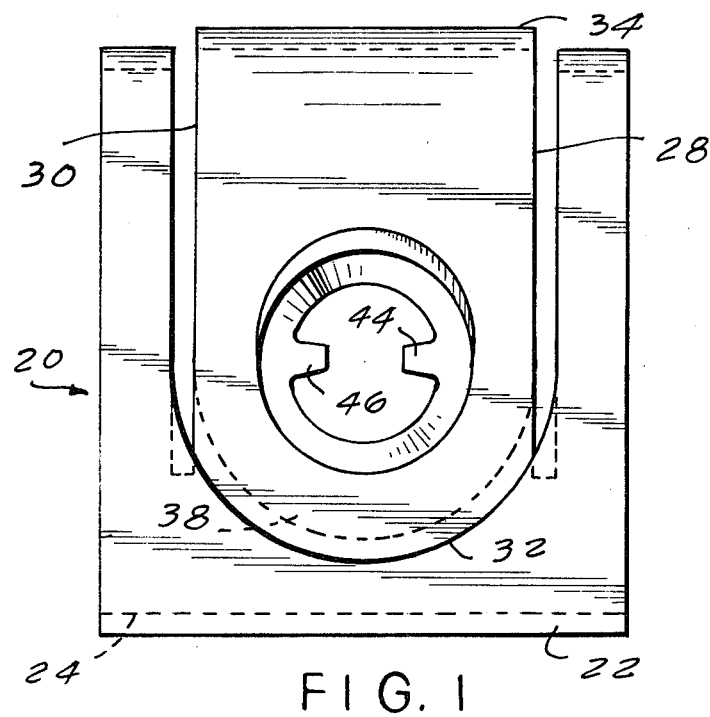
FIG. 1 is a top plan view of the receptacle of the invention.
Figure 2:
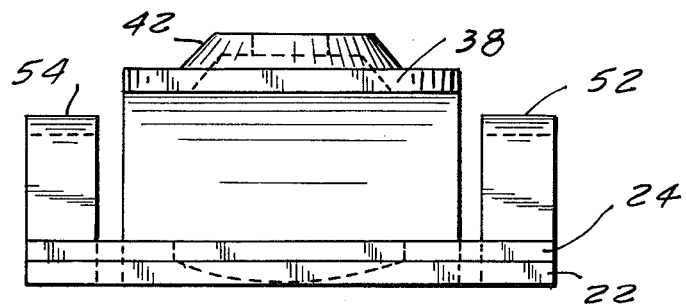
FIG. 2 is a side elevation view thereof.
Figure 3:
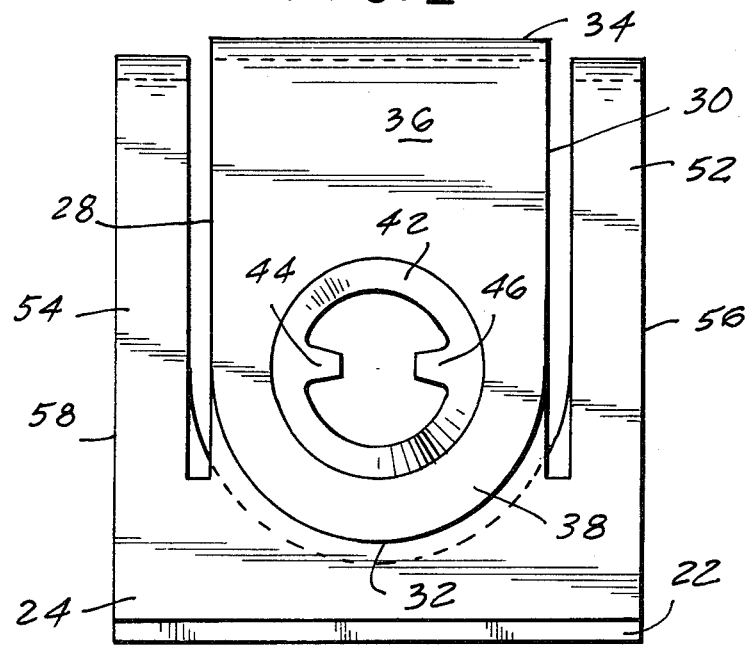
FIG. 3 is a bottom plan view thereof.
Figure 4:
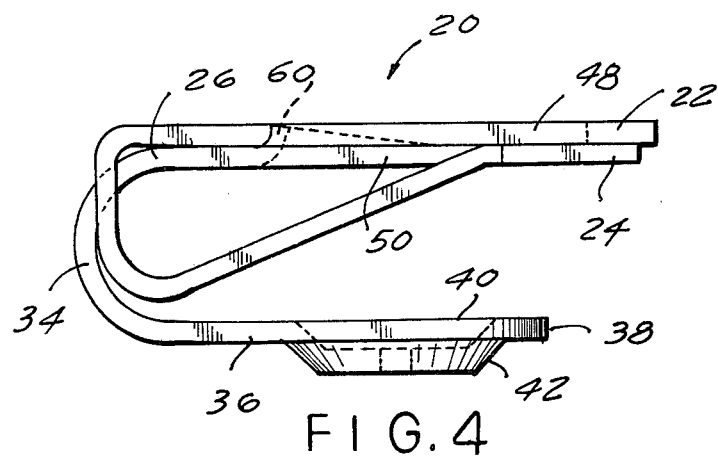
FIG. 4 is an end elevation view thereof.

Receptacle 20 is shown in FIGS. 1-4 independent of engagement with other members. Receptacle 20 has a general U-shaped configuration and is formed of an integral one piece design, for example a strip of spring material such as a spring steel or other metal. The strip is shown in the depicted embodiment as a rectangular unitary member bent into a U configuration so as to form a lower spring section 22 and an upper spring section 24 integrally connected at the closed end of the U-shaped receptacle. A central portion 26 of the strip is severed along two opposing side edges 28 and 30 and one end 32. The severed central portion is bent back upon itself to form an arcuate interconnecting portion 34 and an extending cantilever spring 36 in overlying position with respect to upper spring section 24. The severed end 32 is arcuate in configuration and the edges 28 and 30 are parallel and straight. Cantilever spring 36 terminates in a free end 38. Adjacent to the free end is an aperture 40 formed in the cantilever spring 36 and surrounded by a fustroconical receiving surface 42 for a stud. A pair of opposing tangs 44 and 46 extend inwardly from fustroconical portion 42 into the aperture 40 for engagement with a slot on the stud in the manner discussed below.

Removal of the central portion 26 from lower spring section 22 of receptacle 20 leaves an enlarged opening 48. An opening 50 is formed in upper spring section 24 in alignment with opening 48 and in turn both openings 48 and 50 are aligned with aperture 40 in cantilever spring 36.

A pair of parallel edge portions 52 and 54 are formed between the central portion 26 and the opposing lateral edges 56 and 58 of upper spring section 24. These edge portions 52, 54 are bent upward along the length of the cut between edges 28 and 30 of the central portion 26 and the upper spring section 24. In this manner, the edge portions 52 and 54 facilitate the spring action of the spring sections 22 and 24 when they are separated for mounting of the slip-on receptacle 20 on a member or panel. It should be noted that the bending of edge portions 52 and 54 is maintained to a certain degree so that the edge portions 52 and 54 do not extend further away from upper spring section 24 then cantilever spring 36. This assures that there is not inadvertent or undesirable separation of members being coupled by receptacle 20 and an appropriate stud. The members are held by the locking tension between the stud and the cantilever spring 36.

The surfaces surrounding aperture 50 in spring section 24 include a downward extending lip portion 60 along a predetermined arcuate length around aperture 50. Lip portion 60 is positioned in the depicted embodiment at the rear end of aperture 50 adjacent to the closed end of the U-shaped receptacle 20. Lip 60 facilitates alignment with an appropriate hole in a panel on which the receptacle 20 is mounted by snapping into position in the hole when the receptacle 20 is slipped onto the panel.

Cantilever spring 36 is formed of resilient material and its resilience is determined by the material used and the width and cross sectional dimensions depending upon the nature of the fastener assembly and the materials being fastened. The same is true in regard to spring sections 22 and 24. Since the cantilever spring 36 is severed from spring sections 22 and 24, the strength and resilience of these respective parts can be different and adjusted accordingly.

Lip 60 can be easily integrally formed by bending a portion of the surface surrounding aperture 50 downward. Lip 60 serves a dual purpose. It forms an indexing means for indexing opening 50 in spring section 24 with a hole in the member on which receptacle 20 is mounted thereby providing for ease of assembly. Lip 60 in cooperation with the remainder of receptacle 20 snaps into position holding the receptacle in alignment during the fastening operation. Lip 60 will not pull out of the hole in the member or panel under a shock load and slide out of position which could cause possible jamming of a stud to be inserted through opening 50 during the fastening operation. Lip 60 is shown formed approximately around 180° of the circular aperture 50. The extent of lip 60 is a matter of choice as long as it serves its purpose in locking the receptacle in position and providing for sufficient interengagement to offset shock loads.

As stated above, receptacle 20 can be formed of any conventional well known resilient spring material such as tempered spring steel, or other well known metal or plastic substitutes therefor.

As stated above, since spring sections 22 and 24 are in close fitting engagement with a panel or member inserted therebetween over a substantial portion of the surface area of the spring sections, there is minimal danger of displacement of the panel on which receptacle 20 is mounted with respect to the receptacle and accordingly with respect to elements mounted to the receptacle through attachment by means of the cantilever spring 36. The cantilever spring 36 is spaced a greater distance from the member on which receptacle 20 is mounted than any other portion of the receptacle. Thus, the locking tension between the interconnected elements is retained at the interengagement point with the cantilever spring and not between the spring sections and the panel on which the receptacle is mounted. Therefore, members or panels being held together cannot be separated until the locking tension between the cantilever spring 36 and interengaging stud is exceeded.

Figure 5:
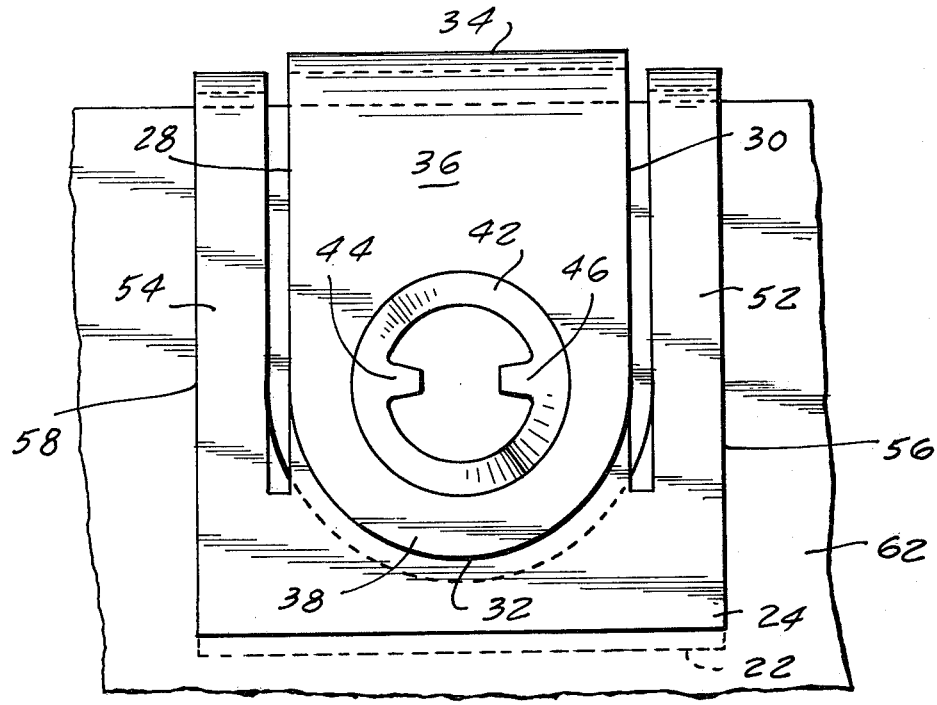
FIG. 5 is a bottom plan view thereof with the receptacle mounted on a fragmentary portion of a panel.
Figure 6:
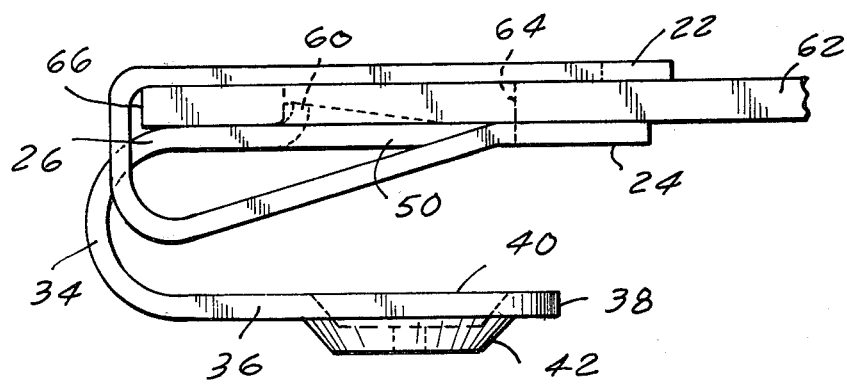
FIG. 6 is an end elevation view with the receptacle mounted on a fragmentary portion of a panel
Figure 7:
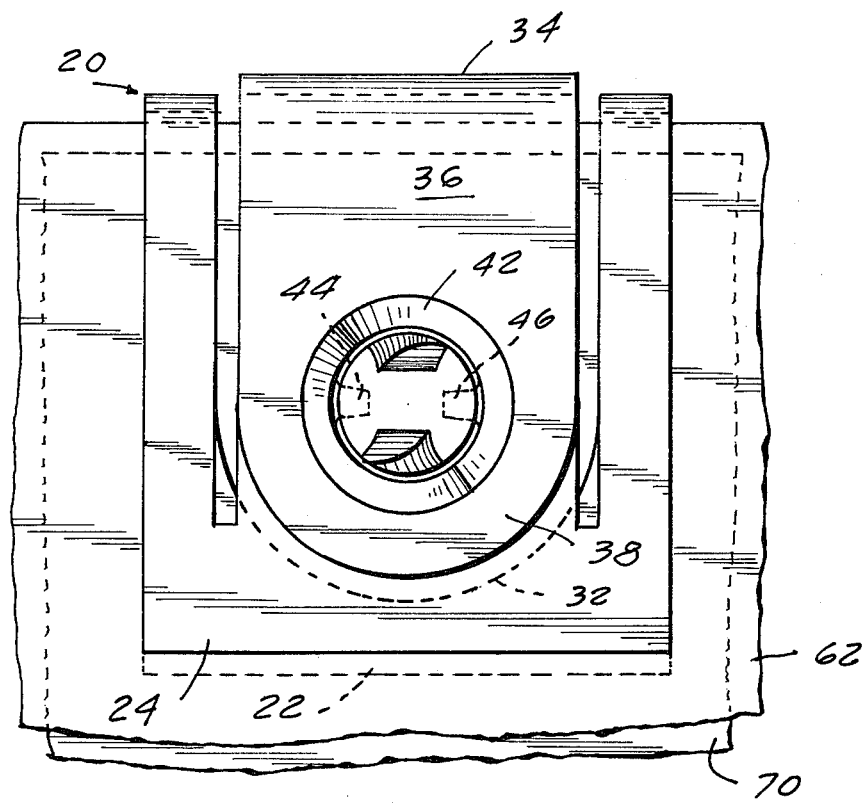
FIG. 7 is a bottom plan view thereof with the receptacle mounted on one panel and a stud mounted on a fragmentary portion of a second panel and the stud coupled with the receptacle holding the two panels together.

FIGS. 5-7 depict receptacle 20 mounted on a panel 62 serving as one of the two members being fastened. Panel 62 has a hole 64 therein which is adapted to be aligned with apertures 48, 50 and 40 in spring section 22, spring section 24, and cantilever spring 36 respectively. Receptacle 20 is slipped onto panel 62 with the leading edge 66 of the panel being inserted between adjacent sides of spring sections 22 and 24. Receptacle 20 is properly indexed with respect to panel 62 in a quick and efficient manner by means of lip 60 which snaps into position in hole 64 without extending entirely through the hole as depicted in FIG. 6. This automatically aligns all of the openings. As panel 62 is inserted, engagement with spring sections 22 and 24 spreads them apart. The tendency of these sections to return to the relaxed condition in engagement with one another forms a retention force for the receptacle on the panel 62. The receptacle is then in position to receive a stud for coupling of the fastener.

Figure 9:
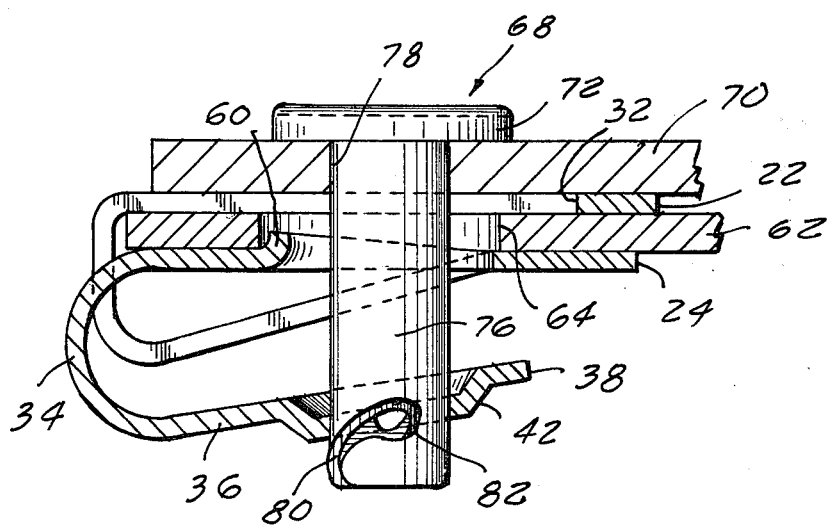
FIG. 9 is a sectional end elevation view thereof taken along the plane of line 9—9 of FIG. 8.
Figure 8:
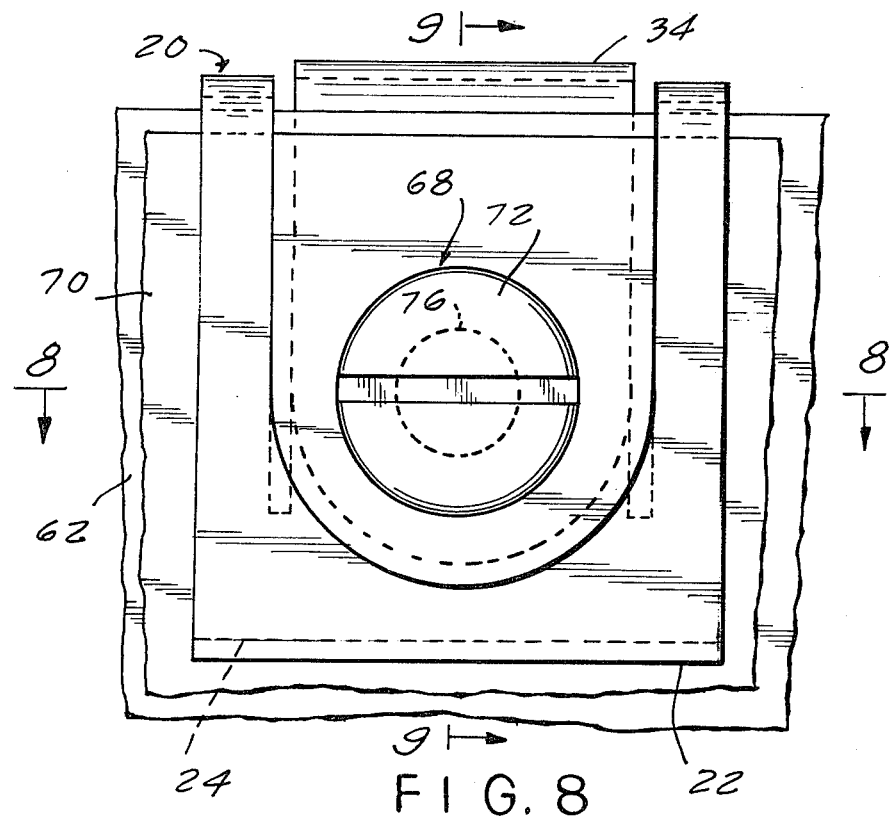
FIG. 8 is a top plan view thereof.
Figure 10:
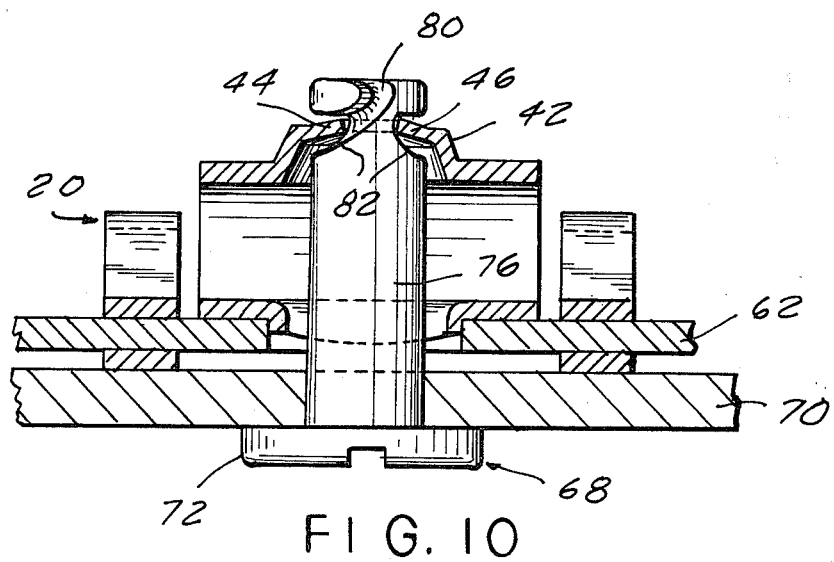
FIG. 10 is a sectional side elevation thereof taken along the plane of line 10—10 of FIG. 8.

FIGS. 8-10 show the interengaged relationship between receptacle 20 mounted on panel 62 and a stud 68 coupled with a second member to be fastened in the form of a panel 70. Stud 68 is a conventional element including an enlarged head 72 with a central slot 74 for engagement by a tool to rotate the stud between the fastened and unfastened positions. A shank portion 76 of narrower diameter than the head 72 is passed through a hole 78 in panel 70 until the undersurface of head 72 engages with the outer surface of panel 70.

A spiral cam slot 80 is adjacent to the end of shank 76 distal from head 72. Spiral cam slot 80 terminates in a locking detent 82 at its inner end. Stud shank 76 has a smaller outer diameter than the diameter of the aligned openings 40, 50, 48, and 64 of the receptacle 20 and panel 62 so that shank 76 is able to pass through these openings and come into alignment with tangs 44 and 46. In this position panel 70 is captured between spring section 22 and the undersurface of head 72 of stud 68. In turn, panel 62 is captured between adjacent surfaces of spring sections 22 and 24. Cantilever spring 36 is free from engagement with the panels and is in position for movement in locking action with stud 68. This is accomplished by rotation of the stud in the locking direction which causes tangs 44 and 46 to follow spiral cam slot 80 until they seat in locking detent 82. The axial movement of the tangs is accommodated by the spring action of cantilever spring 36. In this manner, panels 62 and 70 are retained in tight interengagement.

Receptacle 20 is prevented from over rotation by engagement between edge 66 of panel 62 and the closed arcuate end of integrally formed spring sections 22 and 24. The snap-in lip 60 also assists in frictionally holding the receptacle from rotation with respect to the panels.

Unfastening of the assembly can be accomplished in the same quick and efficient manner. A tool is inserted in slot 74 and stud 68 is rotated in the direction opposite to the fastening direction thus causing tangs 44 and 46 to travel out of detent 82 and along cam slot 80 until the stud is free of the tangs. The stud and panel 70 can then be removed from the receptacle and panel 62.

Since cantilever spring 36 does not engage with panel 62 when the receptacle 20 is mounted thereon, the grip length of the fastener is constant, that is the distance from the exposed face of spring section 22 mounted on panel 62 and the location of tangs 44 and 46 independent of the thickness of the panel 62. Also, it is possible to provide for a lower or greater spring load on cantilever spring 36 and spring sections 22 and 24 to enhance the locking action between the stud and the receptacle leg. This can be accomplished since spring sections 22 and 24 act independently in retaining the receptacle to panel 62 and cantilever spring 36 is only utilized to engage with stud 68. The spring action of spring sections 22 and 24 is partially controlled and enhanced by dimensional variations in the formation of edge portions 52 and 54 on spring section 24.

As stated above, cantilever spring 36 containing tangs 44 and 46 is spaced a fixed distance from the surface of spring section 22 to be brought into engagement with panel 70 coupled with stud 68. Spring sections 22 and 24 are biased and separated to accommodate any one of a range of panel thicknesses in respect to panel 62 inserted therebetween. However, the location of cantilever spring 36 is not affected since cantilever spring 36 is not shifted as receptacle 20 is mounted on panel 62. In general practice, it is preferable to make cantilever spring 36 less stiff than spring sections 22 and 24 to facilitate the fastening operation between the stud and the receptacle and also gain the benefit of a tight interengagement between receptacle 20 and panel 62. This is accomplished by varying the width and cross section of the various portions of receptacle 20.

When stud 68 is inserted through the opening panels 70, 62, and receptacle 20 and engages with tangs 44 and 46, the locking tension on the stud is a function of the cantilever spring 36 acting as a spring member. The panel holding tension is a function of both spring sections 22 and 24 and the cantilever spring 36. If this spring force is exceeded, cantilever spring 36 will move upward until cantilever spring 36 bottoms on the adjacent side of spring section 24. Thus, the outer panel 70 is always clamped to the panel 62, but separation can occur if the spring load is exceeded. In this manner, there is no looseness between parts at any time. This is facilitated by the fact that the spring sections 22 and 24 are in substantially close fitting relationship with respect to panel 62 while cantilever spring 36 is spaced a greater distance from the panel 62. By closely holding panel 62 in position with respect to the receptacle, no undesirable relative movement is permitted such as separation of the panels until the locking tension applied between cantilever spring 36 and stud 68 is exceeded.

It should also be kept in mind that lip 60 will not pull out of opening 64 and panel 62 under shock load during assembly on the panel and with the stud or thereafter in use which could cause the receptacle to slide out of position and engage and jam the shank of the stud.

Receptacle 20 is designed so it can be used with a wide range of panel thicknesses and in one convenient conventional size can be mounted on panels ranging between 0.7 mm to 3.0 mm in thickness.

Also, since the receptacle height remains constant, a simpler table can be used and the receptacle becomes more universal in its application and use. Spring sections 22 and 24 need only be as wide as is necessary to hold receptacle 20 in position on panel 62. As stated above, the spring section tension is independent from the cantilever spring tension.

Receptacle 20 is a one piece metal or plastic part formed so that it can be slipped onto a metal or plastic member having a hole in it. Naturally the receptacle can be formed of several parts which are interconnected, however the preferred form is a one piece design.

Tangs 44 and 46 are positioned for engagement with the spiral cam slot in the stud and could be formed as any well known alternative cam follower structure such as a solid bar. When stud 68 engages the tangs 44 and 46 they move in an axial direction with respect to the stud to exert tension on the stud and hold the outer panel 70 to the inner panel 62 and lock the stud in the detent position with the tangs in corresponding detent 82 at the end of the spiral cam slot.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A slip-on receptacle adapted to be inserted on one of two members to be fastened in alignment with a hole therein and to receive and engage with a stud coupled with the other of the two members so as to fasten the two members together comprising; a resilient strip folded upon itself with one section of the strip engaging the undersurface of the one member and another upper section of the strip engaging the upper surface of the one member, a central portion of the strip severed along both side edges and across one end thereof which is folded upwardly and back upon itself above the upper section to form a cantilever spring, stud engaging means on the cantilever spring in alignment with the hole in the one member to receive the stud coupled with the other member and passed through the hole and to interengage with the stud and hold the members together, the two sections being in close fitting position on the one member in order to reinforce the fastening action and discourage separation of the members when the stud and receptacle are coupled, the upper section of the strip having a pair of parallel edge portions formed between an edge of the strip and an adjacent edge of the central portion, and each edge portion of the upper section being bent upward away from the one member and spaced a lesser distance from the one member than the cantilever spring.

2. The invention in accordance with claim 1 wherein the cantilever spring has an aperture therein and the stud engaging means includes a pair of tangs diametrically opposed and extending inwardly toward one another in the aperture for engagement with a spiral cam slot formed in the end of the stud.

3. The invention in accordance with claim 1 wherein the two sections of the strip engaging the undersurface and upper surface of the one member each has an aperture therein in alignment with the hole in the one member when the receptacle is mounted thereon so that a stud passing through the hole in the one member will pass through aligned apertures in the sections of the strip.

4. The invention in accordance with claim 3 wherein the surfaces surrounding the aperture in the upper section of the strip including a projecting lip adapted for snap-in interengagement with the surfaces surrounding the hole in the one member so as to facilitate alignment and positioning of the receptacle with respect to the one member and retention of the receptacle in proper alignment when mounted thereon due to the lip having a configuration so that it will not be displaced from the hole causing misalignment therewith when subjected to predetermined external forces.

5. The invention in accordance with claim 1 wherein the strip is rectangular in configuration and is formed of a spring metal material, and the cantilever spring having an arcuate free end.

6. The invention in accordance with claim 1 wherein the cantilever spring acts independent of the engagement between the strip and the one member so that the resilient sections of the strip accommodate dimensional width variations of the one member and the cantilever spring remains a fixed distance from the undersurface of the one member engaged by the strip independent of the width dimension of the one member to provide a stud grip length that does not change as a function of the width of the one member.

7. The invention in accordance with claim 1 wherein the cantilever spring is spaced a greater distance from the one member than the remainder of the strip thereby facilitating the prevention of separation of the members at a tension less than the locking tension between the stud engagement means and the stud.

8. The invention in accordance with claim 1 wherein the cantilever spring has a predetermined width and thickness to facilitate locking interengagement with the stud and the remainder of the strip having a predetermined width and thickness to independently provide for the desired gripping force against the one member.

9. A slip-on receptacle adapted to be inserted on one of two members to be fastened in alignment with a hole therein and to receive and engage with a stud coupled with the other of the two members so as to fasten the two members together comprising; a resilient strip folded upon itself with one section of the strip engaging the undersurface of the one member and another section of the strip engaging the upper surface of the one member, a central portion of the strip severed along both side edges and across one end thereof which is folded upwardly and back upon itself above the upper section to form a cantilever spring, stud engaging means on the cantilever spring in alignment with the hole in the one member to receive the stud coupled with the other member and passed through the hole and to interengage with the stud and hold the members together, the two sections being in close fitting position on the one member in order to reinforce the fastening action and discourage separation of the members when the stud and receptacle are coupled, the two sections of the strip engaging the undersurface and upper surface of the one member each having an aperture therein in alignment with the hole in the one member when the receptacle is mounted thereon so that a stud passing through the hole in the one member will pass through aligned apertures in the sections of the strip, and the aperture in the section of the strip engaging the undersurface of the one member is formed by the removal of the central portion of the strip to form the cantilever spring.

* * * * *